(12) United States Patent
Ding et al.

(10) Patent No.: US 12,079,005 B2
(45) Date of Patent: Sep. 3, 2024

(54) THREE-LAYER INTELLIGENCE SYSTEM ARCHITECTURE AND AN EXPLORATION ROBOT

(71) Applicant: Harbin Institute of Technology, Haerbin (CN)

(72) Inventors: liang Ding, Haerbin (CN); haibo Gao, Haerbin (CN); ye Yuan, Haerbin (CN); yan Liu, Haerbin (CN); zongquan Deng, Haerbin (CN); shu Li, Haerbin (CN); zhen Liu, Haerbin (CN)

(73) Assignee: Harbin Institute of Technology, Haerbin (CN)

( * ) Notice: Subject to any disclaimer, the term of this patent is extended or adjusted under 35 U.S.C. 154(b) by 0 days.

(21) Appl. No.: 17/026,342

(22) PCT Filed: Jul. 10, 2020

(86) PCT No.: PCT/CN2020/101380
§ 371 (c)(1),
(2) Date: Sep. 21, 2020

(87) PCT Pub. No.: WO2021/114654
PCT Pub. Date: Jun. 17, 2021

(65) Prior Publication Data
US 2022/0350341 A1    Nov. 3, 2022

(30) Foreign Application Priority Data

Dec. 13, 2019    (CN) .......................... 201911283281.5

(51) Int. Cl.
*G06F 3/01* (2006.01)
*B64G 1/16* (2006.01)
*G05D 1/00* (2006.01)

(52) U.S. Cl.
CPC .......... *G05D 1/0251* (2013.01); *G05D 1/0206* (2013.01); *G05D 1/0221* (2013.01); *G05D 1/0276* (2013.01); *G06F 3/011* (2013.01)

(58) Field of Classification Search
CPC .. G05D 1/0251; G05D 1/0206; G05D 1/0221; G05D 1/0276; G05D 1/0044;
(Continued)

(56) References Cited

U.S. PATENT DOCUMENTS 9,477,307 B2 * 10/2016 Chizeck .................. G06T 15/04
9,753,542 B2 *  9/2017 Chizeck .................. G06F 3/016
(Continued)

OTHER PUBLICATIONS

Liu et al., "Smart Design and Simulation of Aerospace Control System Based on Digital Twin", Mar. 2019, Journal of System Simulation, vol. 31, Issue 3, pp. 377-384. DOI: 10.16182/j.issn1004731x.joss.18-FZ0524 (Year: 2019).*
(Continued)

*Primary Examiner* — Jaime Figueroa
(74) *Attorney, Agent, or Firm* — Chun-Ming Shih; LANWAY IPR SERVICES (57) ABSTRACT

A three-layer intelligence system architecture and an exploration robot are provided. The three-layer intelligence system architecture includes: a digital twin module for creating a virtual exploration environment and a virtual robot according to explored environment data acquired in real time by the exploration robot and robot data of the exploration robot; a virtual reality module for generating a process and a result of the virtual robot executing the control commands in the virtual exploration environment according to the virtual exploration environment, the virtual robot, and control commands of a control personnel for the exploration robot; and a man-machine fusion module for transmitting the control commands and showing the control personnel the process and the result of the virtual robot executing the control
(Continued)

commands in the virtual exploration environment, and causing the exploration robot to execute the control commands after acquiring a feedback indicating that the control personnel confirms the control commands.

6 Claims, 4 Drawing Sheets

(58) Field of Classification Search
CPC ......... G05D 2201/0218; G05D 1/0236; G05D 1/0214; G05D 1/0223; G05D 1/024; G05D 1/0257; G05D 2201/02; G06F 3/011; B64G 1/16
USPC ........................................................ 701/1, 21
See application file for complete search history.

(56) References Cited

U.S. PATENT DOCUMENTS

| | | | | |
|---|---|---|---|---|
| 10,078,712 | B2* | 9/2018 | Bacon | G06F 30/20 |
| 10,452,078 | B2* | 10/2019 | Zhao | G05D 1/0276 |
| 10,695,689 | B2* | 6/2020 | Weston | A63J 1/02 |
| 11,079,897 | B2* | 8/2021 | Yerli | B25J 9/1689 |
| 11,280,509 | B2* | 3/2022 | Sinha | G05B 15/02 |
| 11,396,100 | B2* | 7/2022 | Krause | G06T 7/75 |
| 11,556,118 | B2* | 1/2023 | Krautwurm | G05B 19/41885 |
| 11,584,020 | B2* | 2/2023 | Huang | B25J 13/006 |
| 11,762,369 | B2* | 9/2023 | Edwards | B25J 9/1676 |
| | | | | 700/3 |
| 2004/0030449 | A1* | 2/2004 | Solomon | H04L 67/12 |
| | | | | 700/245 |
| 2015/0057801 | A1* | 2/2015 | Stephens, Jr. | B25J 9/1689 |
| | | | | 901/1 |
| 2018/0329433 | A1* | 11/2018 | Zhao | G05D 1/0094 |
| 2019/0196457 | A1* | 6/2019 | Krautwurm | G05B 19/41885 |
| 2019/0201806 | A1* | 7/2019 | Weston | A63G 31/16 |
| 2019/0361589 | A1* | 11/2019 | Yerli | B25J 9/1689 |
| 2019/0385364 | A1* | 12/2019 | Joseph | G06T 17/00 |
| 2020/0078948 | A1* | 3/2020 | Krause | G06T 7/75 |
| 2020/0171671 | A1* | 6/2020 | Huang | B25J 9/0084 |
| 2020/0259896 | A1* | 8/2020 | Sachs | H04J 3/0667 |
| 2022/0242450 | A1* | 8/2022 | Sokolov | B60W 60/0015 |
| 2022/0308734 | A1* | 9/2022 | Wilkinson | H04N 7/18 |

OTHER PUBLICATIONS

Schluse et al., "Experimentable digital twins for model-based systems engineering and simulation-based development," 2017 Annual IEEE International Systems Conference (SysCon), Montreal, QC, Canada, 2017, pp. 1-8, doi:10.1109/SYSCON.2017.7934796. (Year: 2017).*

Schluse et al., "Experimentable Digital Twins—Streamlining Simulation-Based Systems Engineering for Industry 4.0," Apr. 2018, IEEE Transactions on Industrial Informatics, vol. 14, No. 4, pp. 1722-1731, doi: 10.1109/TII.2018.2804917. (Year: 2018).*

M. Allan et al., "Planetary Rover Simulation for Lunar Exploration Missions," 2019 IEEE Aerospace Conference, Big Sky, MT, USA, 2019, pp. 1-19, doi: 10.1109/AERO.2019.8741780. (Year: 2019).*

Schuster et al., Towards Autonomous Planetary Exploration: The Lightweight Rover Unit (LRU), 2017, Springer, Journal of Intelligent & Robotic Systems. pp. 1-34. doi: 10.1007/s10846-017-0680-9 <https://doi.org/10.1007/s10846-017-0680-9>. ISSN 0921—(Year: 2017).*

T. Cichon and J. Roßmann, "Digital Twins: Assisting and Supporting Cooperation in Human-Robot Teams," 2018 IEEE, 15th International Conference on Control, Automation, Robotics and Vision (ICARCV), Singapore, 2018, pp. 486-491, doi: 10.1109/ICARCV.2018.8580634. (Year: 2018).*

Shafto, Mike, et al. "Modeling, Simulation, Information Technology & Processing Roadmap." (2012), NASA, pp. 1-32. (Year: 2010).*

\* cited by examiner

THREE-LAYER INTELLIGENCE SYSTEM ARCHITECTURE AND AN EXPLORATION ROBOT

BACKGROUND OF THE INVENTION

Field of the Invention

The present invention relates to the field of robots, in particular to a three-layer intelligence system architecture and an exploration robot.

Description of Related Art

Exploration robots are widely used in scientific exploration fields unknown to humans such as planetary exploration, deep-sea exploration, cave exploration, etc., to meet the needs of scientific experiments and development.

At the same time, with the continuous development of technology, a large number of advanced inspection devices are widely used in exploration robots to obtain more and more comprehensive robot site information. Meanwhile, with the extensive application of computer information technology, it is possible to predict the next operation result of the exploration robot based on the obtained robot site information to form new information for the operator and related personnel to use. This also leads to an excessive amount of information, so that the robot controller and related personnel cannot obtain all the effective information in a short time, and cannot effectively control the exploration robot based on the amount of information, especially the robot used for planetary exploration.

SUMMARY OF THE INVENTION

The present invention aims to solve, to some extent, the problem that in the control process of the existing exploration robot, the control personnel and related cooperation personnel cannot effectively control the exploration robot due to large amount of information transmitted by the parties to the control personnel and related cooperation personnel.

In order to solve the above problem, a three-layer intelligence system architecture for an exploration robot is provided in the present invention, which includes a digital twin module for creating a virtual exploration environment and a virtual robot according to environment data of an explored environment acquired in real time by the exploration robot and robot data of the exploration robot; a virtual reality module for generating a process and a result of the virtual robot executing the control commands in the virtual exploration environment according to the virtual exploration environment, the virtual robot, and control commands of a control personnel for the exploration robot; and a man-machine fusion module for transmitting the control commands and showing the control personnel the process and the result of the virtual robot executing the control commands in the virtual exploration environment, and causing the exploration robot to execute the control commands after acquiring a feedback indicating that the control personnel confirms the control commands.

In one embodiment, the digital twin module causes the explored environment and the virtual detection environment to map to each other, and/or the digital twin module causes the exploration robot and the virtual robot to map to each other.

In one embodiment, the control commands include: determining a scientific exploration target of the exploration robot or determining a traveling path of the exploration robot.

In one embodiment, the three-layer intelligence system architecture for an exploration robot and a cloud platform are mapped to each other.

In one embodiment, the cloud platform has a plurality of cloud platforms.

The plurality of cloud platforms include: a digital cloud platform module, mapped to the virtual intelligent general module; and/or a physical cloud platform module, mapped to the exploration robot; and/or a biological cloud platform module, mapped to the control personnel through the man-machine fusion module.

In one embodiment, the digital twin module is configured to create the virtual exploration environment according to environment data of the explored environment acquired in real time by the exploration robot and set data.

In one embodiment, the man-machine fusion module includes VR glasses and/or somatosensory seats to show the control personnel the process of the virtual robot executing the control commands in the virtual exploration environment.

In one embodiment, the explored environment is synchronized with the virtual exploration environment in real time, and the exploration robot is synchronized with the virtual robot in real time.

An exploration robot is provided in the present invention. The exploration robot includes the three-layer intelligence system architecture.

In one embodiment, the exploration robot is a planetary intelligent exploration robot or a deep-sea intelligent exploration robot.

For the three-body intelligent robot of the present invention, by creating environment data of an explored environment acquired in real time by the exploration robot and robot data of the exploration robot as a virtual exploration environment and a virtual robot through a virtual intelligent general module, and then by showing a control personnel a situation of the virtual robot in the virtual exploration environment through a man-machine fusion module, e.g., by causing the control personnel and related personnel to feel the explored environment and the situation of the detection robot in the environment through VR technology and somatosensory seats, a large amount of data information may be fully integrated and comprehensively and vividly displayed to the control personnel and related personnel, so that the robot control personnel and related personnel are fully informed.

On this basis, by transmitting the control commands and showing the control personnel the process and the result of the virtual robot executing the control commands in the virtual exploration environment through the man-machine fusion module, the control personnel are accurately informed of the execution processes and results of the control commands, so as to avoid the occurrence of danger, and to improve the control efficiency and precision of the exploration robot.

BRIEF DESCRIPTION OF THE DRAWINGS

Aspects of the present invention are best understood from the following detailed description when read with the accompanying figures. It is noted that, in accordance with the standard practice in the industry, various features are not

DESCRIPTION OF THE PREFERRED EMBODIMENTS

To enable the above objects, features and advantages of the present invention to be more apparent and easily understood, the specific embodiments of the present invention will be further elaborated hereafter in connection with the drawings.

The terms '1st', '2nd' are used only for description and shall not be interpreted as an indication or implication of relative importance or an implicit indication of the number of technical features. Thus, features defined with "first", "second" may include at least one such feature, either explicitly or implicitly.

For drawings of the embodiments, it should be noted that in order to make these embodiments as open and sufficient as possible, there are too many detailed flowcharts of the three-layer intelligence system architecture for the exploration robot, which leads to an excessively large flowchart. Therefore, in order to clarify the drawings of these embodiments, the flowchart of the three-layer intelligence system architecture for the exploration robot is divided into three parts: A, B and C. The division of these three parts is not strictly limited, and the main purpose is to make the process of the detailed refinement of the three-layer intelligence system architecture for the exploration robot clear.

Meanwhile, in FIGS. 1 to 4, the first connection point 1, the second connection point 2, the third connection point 3, the fourth connection point 4 and the fifth connection point 5 are only for the purpose of accurately correlating the detailed processes of the three-layer intelligence system architecture of the exploration robot with each other, so as to ensure accuracy in correlating FIG. 1 to FIG. 4.

It should be noted that in each of the embodiments of the present invention, the functional units described in the form of systems, modules, etc. may be mechanical or electronic functional units that realize physical functions, or computer program functional units running on computing devices. Multiple functional units can be integrated in one physical device or each unit may independently be located in physical devices, or two or more units may be integrated into one physical device. If the functional units are implemented in the form of a computer software functional unit and sold or used as an independent product, they can also be stored in one or more computer-readable storage mediums.

In general, the computer commands for implementing the computer program functional unit of the present invention can be carried by any combination of one or more computer-readable medium. The computer-readable medium may be a computer-readable signal medium or a computer-readable storage medium. The so-called non-transitory computer-readable medium may include any computer-readable medium except for the temporarily transmitted signal itself.

The computer-readable storage medium may be, for example, but not limited to, an electrical, magnetic, optical, electromagnetic, infrared, or semiconductor system, device, or device, or any combination of the above. More specific examples (non-exhaustive list) of computer-readable storage medium include: electrical connections with one or more wires, portable computer diskettes, hard disks, RAM, ROM, EPROM or flash memory, optical fiber, CD-ROM, optical storage device, magnetic storage device, or any combination of the above.

With reference to FIGS. 1 to 4, this embodiment provides a three-layer intelligence system architecture for an exploration robot including a digital twin module, a virtual reality module and a man-machine fusion module. The digital twin module is configured to create a virtual exploration environment and a virtual robot according to environment data of an explored environment acquired in real time by the exploration robot and robot data of the exploration robot; the virtual reality module is configured to generate a process and a result of the virtual robot executing the control commands in the virtual exploration environment according to the virtual exploration environment, the virtual robot, and control commands of a control personnel for the exploration robot; the man-machine fusion module is configured to transmit the control commands and showing the control personnel the process and the result of the virtual robot executing the control commands in the virtual exploration environment, and cause the exploration robot to execute the control commands after acquiring a feedback indicating that the control personnel confirms the control commands.

It should be noted that simultaneously, the virtual exploration environment may be created according to the environment data of the exploration environment acquired in real time by the exploration robot and the environment data obtained by observation and detection of the exploration environment in advance.

In addition, the three-layer intelligence system architecture for an exploration robot further includes a virtual intelligent general module, the virtual intelligent general module comprising the digital twin module and the virtual reality module.

The virtual intelligent general module involved in the present invention refers to a virtual digital model created during the design, development, development and application of the robot system, which can imitate real objects, environments or imagined objects and environments in reality, has a strong similarity to the imitated object in form, texture, texture, etc., and can reflect the relevant characteristics of the imitated object. Virtual digital aircraft, virtual digital planetary rovers, virtual digital scenes, etc. all belong to the category of digital objects in the present invention.

In addition, the control personnel mentioned in the embodiment does not only refer to the control personnel who controls the detection robot, but also includes technical personnel who have received certain education, have certain knowledge and operation ability, can assign tasks to robots, conduct human-computer interaction, and develop robots, and includes non-technical personnel who can be serviced or assisted by robots or virtual reality. Medical staff, scientific research personnel, technical workers, management personnel, old and young, sick and disabled all belong to the category of human in the present invention. That is to say, the control personnel includes at least scientists and engineers. After the subsequent scientists and engineers are combined with the biological cloud platform module, the intelligence of the scientists and engineers is formed.

Additionally, the environmental data of the explored environment may include various environmental data such as data of weather conditions of the explored environment, data of topography and the like.

Further, the exploration robot may be an intelligent exploration robot. The intelligent exploration robot is capable of independent scientific detection and independent design choice of a driving route.

Moreover, the control command may refer to the human assisting the robot to make related decisions (for example, judging scientific goals; when the driving path is very complicated and the robot cannot solve it by itself, the ground staff assigns a path), thereby reflecting the mutual integration of the exploration robot and the control personnel and assistant coordination personnel.

For the three-body intelligent robot of the embodiment, by creating environment data of an explored environment acquired in real time by the exploration robot and robot data of the exploration robot as a virtual exploration environment and a virtual robot through a virtual twin module, and a process and a result of the virtual robot executing the control commands in the virtual exploration environment are generated through a virtual reality module; and then by showing a control personnel a situation of the virtual robot in the virtual exploration environment through a man-machine fusion module, e.g., by causing the control personnel and related personnel to feel the explored environment and the situation of the detection robot in the environment through VR technology and somatosensory seats, a large amount of data information may be fully integrated and comprehensively and vividly displayed to the control personnel and related personnel, so that the robot control personnel and related personnel are fully informed.

On this basis, by transmitting the control commands to the virtual intelligent general module through the man-machine fusion module and showing the control personnel the process and the result of the virtual robot executing the control commands in the virtual exploration environment, the control personnel are accurately informed of the execution processes and results of the control commands, so as to avoid the occurrence of danger, and to improve the control efficiency and precision of the exploration robot.

With reference to FIGS. 1 to 4, preferably, the digital twin module may cause the explored environment and the virtual detection environment to map to each other, and/or the digital twin module may cause the exploration robot and the virtual robot to map to each other.

The digital twin module of the embodiment is an organic combination of the exploration robot and the virtual intelligent general module. It is a system that combines physicality and digitality, and the two interact and coexist. The digital twin module integrates multi-disciplinary and multi-physical quantities to create a virtual model of physical entities in a digital way and to complete the mapping between virtual space and real space, as well as reflecting the running state of the physical entity of the exploration robot in the virtual exploration environment. Further, the digital twin module may be used in the design, production, testing and other stages of the exploration robot. For example, in the testing phase of the exploration robot, the robot data of the exploration robot obtained in the virtual intelligent general module may be modified to detect the reaction of the exploration robot and improve the overall performance of the exploration robot through continuous iteration. In the actual use phase of the exploration robot, the remote monitoring and operation control of the robot may be performed through the digital twin module to map various self-state related information obtained during the operation of the exploration robot to the virtual robot in real time, and to reflect the effect of state control on the virtual robot on the real exploration robot. The digital twin module may realize the mutual feedback of the status between the real exploration robot and the virtual robot. The virtual robot may automatically make changes following the exploration robot, and the exploration robot may also adjust the motion state according to the commands received by the virtual robot. The digital twin module includes key technologies such as high-performance computing, advanced sensor acquisition, digital simulation, intelligent data analysis, two-way information communication control.

Further, for the digital twin module, the planetary exploration robot transmits the obtained exploration information to the virtual intelligent general module, and the virtual intelligent general module reacts accordingly according to the exploration information. When the virtual intelligent general module executes the control commands, it also transmits the information to the real robot, and the real robot also performs related actions, thereby realizing real-time control of the exploration robot.

The virtual reality module referred to in the present invention is an organic combination of human beings and digital bodies, and is a system combining digitality and biologicality. The two interact and coexist with each other. The virtual reality module may augment reality and so on. The control personnel may use the virtual reality module to perceive and interact with the virtual exploration environment and the virtual robot in the virtual intelligence general module, which may bring the feeling and experience of interacting with the exploration robot to the control personnel. The virtual reality module includes key technologies such as dynamic environment modeling technology, real-time 3D graphics generation technology, stereo display and sensor technology.

Moreover, it should be noted that the virtual reality module enables the control personnel and other cooperating personnel to interact with the virtual exploration environment and the virtual robot. For example, the control personnel and other cooperating personnel may use the keyboard, mouse, VR glasses, and somatosensory seats to control the virtual robot in the virtual digital environment (i.e., the virtual exploration environment) and receive feedback from the virtual robot.

With reference to FIGS. 1 to 4, preferably, the three-layer intelligence system architecture for an exploration robot and a cloud platform map with each other.

With reference to FIGS. 1 to 4, preferably, the cloud platform has a plurality of cloud platforms. The plurality of cloud platforms include:

a digital cloud platform module, mapped to the virtual intelligent general module; and/or a physical cloud platform module, mapped to the exploration robot; and/or a biological cloud platform module, mapped to the control personnel through the man-machine fusion module.

That is to say, the plurality of cloud platforms at least includes one of the digital cloud platform module, the physical cloud platform module and the biological cloud platform module.

The exploration robot and the virtual intelligent general module may offload large-scale data processing, difficult movement planning, multi-machine collaboration and other intensive calculations to the physical cloud platform module and digital cloud platform module through network communication, and may return the calculation results or store related data after calculation through the cloud platforms, etc. Meanwhile, with the powerful resource sharing and on-line learning capabilities of the cloud platform, through full utilization of the capabilities of the cloud platform, the calculation and storage load of the exploration robot and the virtual intelligent general module may be reduced respectively, and the decision-making, execution, calculation and storage capabilities of exploration robots and virtual intelligence modules are expanded, so that they may free themselves from the constraints of ontology constraints and may solve a series of complex problems more efficiently. In addition, since the physical cloud platform module and the digital cloud platform module do not rely on the exploration robot and the virtual intelligent general module body, the physical cloud platform module and the digital cloud platform module may perform on-line learning and other work when there is no requirement for their ontology computing tasks. The biological cloud platform module works slightly differently from the digital cloud platform module and the physical cloud platform module. The biological cloud platform module may store multiple control personnel and other related information, and different control personnel may directly exchange information with the biological cloud platform module as well as using the storage and computing functions. The biological cloud platform module may also provide the relevant information of the corresponding control personnel to the exploration robot or the virtual intelligent general module when the control personnel interact with the exploration robot or the virtual intelligent general module, so as to provide personalized services for users.

In summary, the cloud platform mapping-physical cloud platform module, digital cloud platform module and biological cloud platform module-is added, wherein the interconnection between the three parts effectively improves the work efficiency of the entire system architecture and has more powerful functions.

Specifically, the biological cloud platform module may perform common thinking, historical experience, collective wisdom, and the amount of data is greater than or equal to the library;

the physical cloud platform module may perform fault diagnosis, life assessment, productivity level, calculation and analysis, and the amount of data is greater than the library;

the digital cloud platform module may perform comparative analysis and prediction, and is forward-looking.

With reference to FIGS. 1 to 4, preferably, the virtual intelligent general module creates a virtual exploration environment according to environment data of an explored environment acquired in real time by the exploration robot and set data.

With reference to FIGS. 1 to 4, preferably, the man-machine fusion module includes VR glasses and/or somatosensory seats to show the control personnel the process of the virtual robot executing the control commands in the virtual exploration environment.

With reference to FIGS. 1 to 4, preferably, the explored environment is synchronized with the virtual exploration environment in real time, and the exploration robot is synchronized with the virtual robot in real time.

In addition, the embodiment further provides an exploration robot, which includes the above three-layer intelligence system architecture for an exploration robot.

With reference to FIGS. 1 to 4, preferably, the exploration robot is a planetary exploration robot or a deep-sea exploration robot.

In order to explain the three-layer intelligence system architecture for an exploration robot and an exploration robot clearly in this embodiment, the following uses a planetary exploration robot as an example to explain; of course, the deep-sea exploration robot and other exploration robots may also use this system architecture.

For the planetary exploration robot, the control personnel may refer to engineers and scientists on the ground, etc. They may set scientific exploration targets for the planetary exploration robot, use various data collected by the planetary exploration robot to analyze the surface conditions of the planet, and help when the planetary exploration robot is in trouble or unable to make decisions.

The planetary exploration robot may have functions such as autonomous navigation, scientific instrument operation and scientific target exploration in non-rugged and complex environments;

the virtual intelligent general module may be a virtual planetary exploration robot in virtual simulation software and a virtual environment in which the two may perform virtual interaction.

Moreover, in the initial development stage of the planetary exploration robot, the scientific research personnel may design the body structure, size configuration, electric control system, control algorithm, etc. of the planetary exploration robot through the process of demand analysis and solution demonstration. During design, the virtual intelligent general module may be used for three-dimensional modeling, and the virtual simulation software may be used to create virtual models such as robots and environment, so as to device relevant software and perform a lot of basic experimental research in the real environment; mapping the real physical information obtained from the experiment to the virtual environment to establish a high-fidelity virtual model ma verify the feasibility of the algorithm in the virtual environment, so as to reduce the risk caused by experimental uncertainty and shorten the development cycle. Based on the experimental and simulation results, the existing program may be further optimized and improved. Meanwhile, the virtual reality device may be used to manipulate the virtual planetary exploration robot in a high-fidelity virtual environment, practice specifying scientific goals, send control commands, etc. to train operators of the planetary exploration robot. During this stage, the man-machine fusion, virtual reality, digital twin modules are fully used to play an important role in the key links of body design, algorithm optimization, solution verification and simulation training for the planetary exploration robot.

After the planetary exploration robot reaches the surface of a planet, the information of the planetary exploration robot and the environment information are transmitted to the ground through satellite communication, i.e., environmental data of the explored environment acquired by the exploration robot in real time and robot data of the exploration robot, and then the virtual intelligent general module creates a virtual exploration environment and a virtual robot according to the above information. At the same time, the situation of the virtual robot in the virtual exploration environment may be shown to the control personnel through the man-machine fusion module, e.g., VR glasses, somatosensory seats and other devices may be used to make the control personnel feel the motion status of the planetary exploration robot and the surrounding environment information in the virtual exploration environment, and the virtual robot is controlled through the mouse, keyboard, handle and other devices. And the virtual robot is commanded to complete autonomous path planning and path tracking in the virtual exploration environment through the man-machine fusion module, and the running status of the virtual robot is evaluated in the virtual exploration environment; if the effect is not good, the control personnel may intervene manually to give the key points or the complete path, and the above process may be repeated many times to find the best control strategy for the robot. Subsequently, the best control command, i.e., after the control personnel confirms the control command, is uploaded to the control system of the planetary exploration robot body through satellite communication, so that the exploration robot may perform relevant operations according to the command, and feedback the state of the exploration robot on the planet surface to the virtual robot to update the state of the virtual robot, i.e., the explored environment and the virtual exploration environment are synchronized in real time, and the exploration robot and the virtual robot are synchronized in real time, thereby making the states of the exploration robot and the virtual robot consistent. This stage fully makes use of the advantages and characteristics of man-machine integration, virtual reality, and digital twin module, which not only enhances the intuitive perception ability of the ground operators, but also plays an important role in the analysis of the difficulty coefficient of the unknown operation of the planetary exploration robot and the verification of the availability solution.

With reference to FIGS. 1 to 4, after the planetary exploration robot lands on the surface of the explored planet, it uses the sensing system composed of various sensors carried by itself to perform multi-source information measurement (using the camera to measure image information; using Lidar to measure 3D point cloud information to perceive distance and depth; using the motor encoder to measure wheel rotation angular velocity; using the inertial measurement unit IMU to measure the attitude information of the exploration robot; using six-dimensional force sensors to measure the state of force at each key position of the robot, and so on). While measuring the information, it is transmitted to the virtual digital environment of the planetary exploration robot on the ground (that is, the virtual intelligent general module), and the virtual digital exploration robot with a highly fidelity and virtual digital planetary environments are created according to the environment image, point cloud, detection of the robot's speed, pose and force, etc. (that is, to create a virtual exploration environment and a virtual robot according to environment data of a detected environment acquired in real time by the exploration robot and robot data of the exploration robot). The planetary exploration robot uses the relevant information measured by the perception system to identify and estimate the planet soil properties, and then simultaneously locate and create a map containing the geometric and physical properties of the planet's surface (i.e., SLAM & Characterization in FIG. 1), at which time the obtained related information is also transmitted to the virtual digital body. After the planetary exploration robot completes the above work, the scientific mission planning and decision-making should be performed. At present, the planetary exploration robot has limited intelligence, and it may not temporarily perform the planning of related scientific tasks (explain the scientific task: e.g., which stone is more scientifically valuable and requires detection device to detect its composition? or where the star soil/soil is more representative and needs to be taken back to Earth? Etc.). At this time, the assistance from scientists on the ground is needed. The scientists on the ground have a wealth of scientific research accumulation in related fields, may judge the scientific value based on experience, and determine what the scientific goals to be explored and which scientific detection instruments to use to detect the target. Then, after the ground scientist confirms the target, the command is transmitted to the planetary exploration robot.

Figure 1:
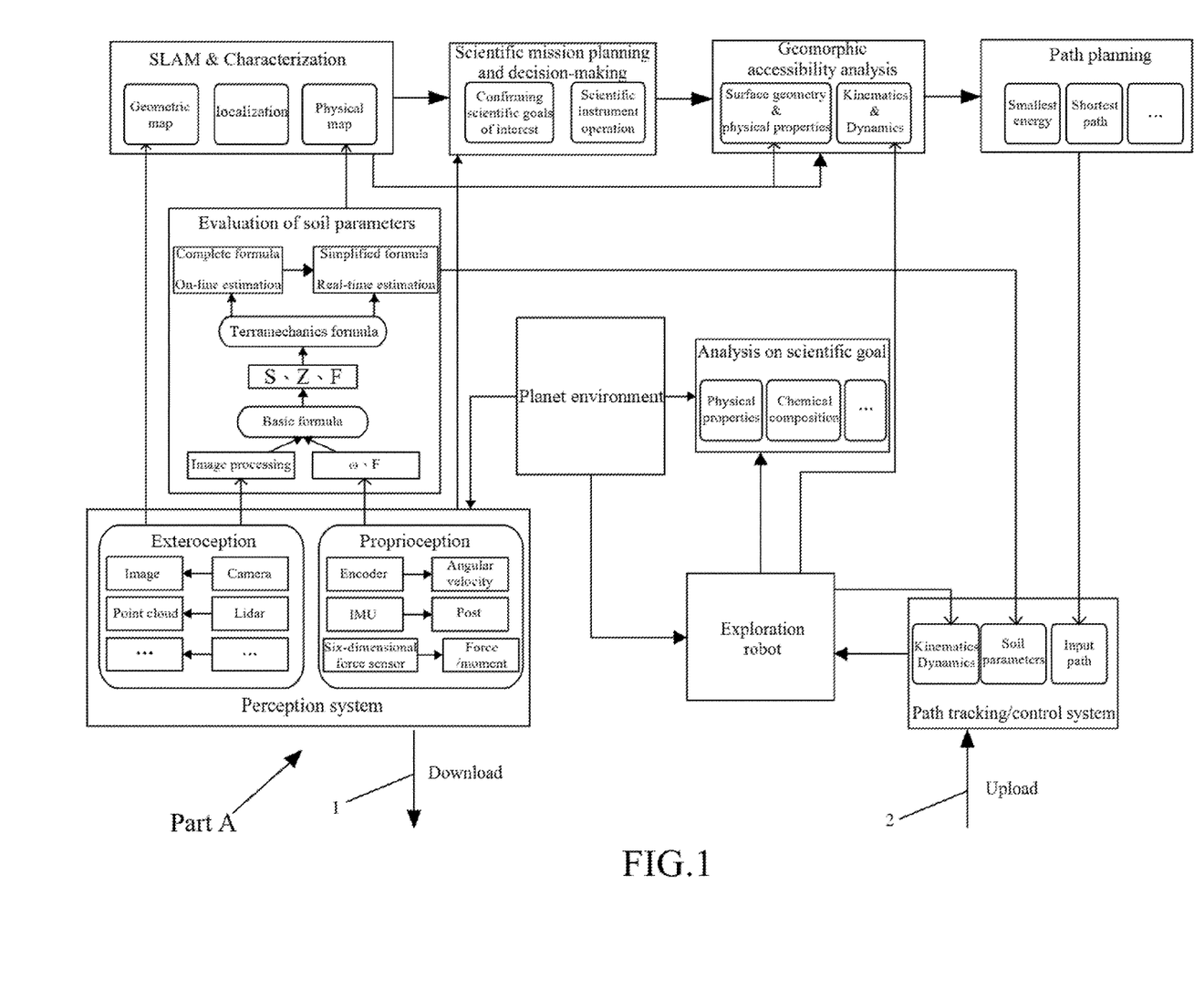
FIG. 1 is a schematic flowchart of part A of a three-layer intelligence system architecture for an exploration robot according to an embodiment of the present invention.
Figure 2:
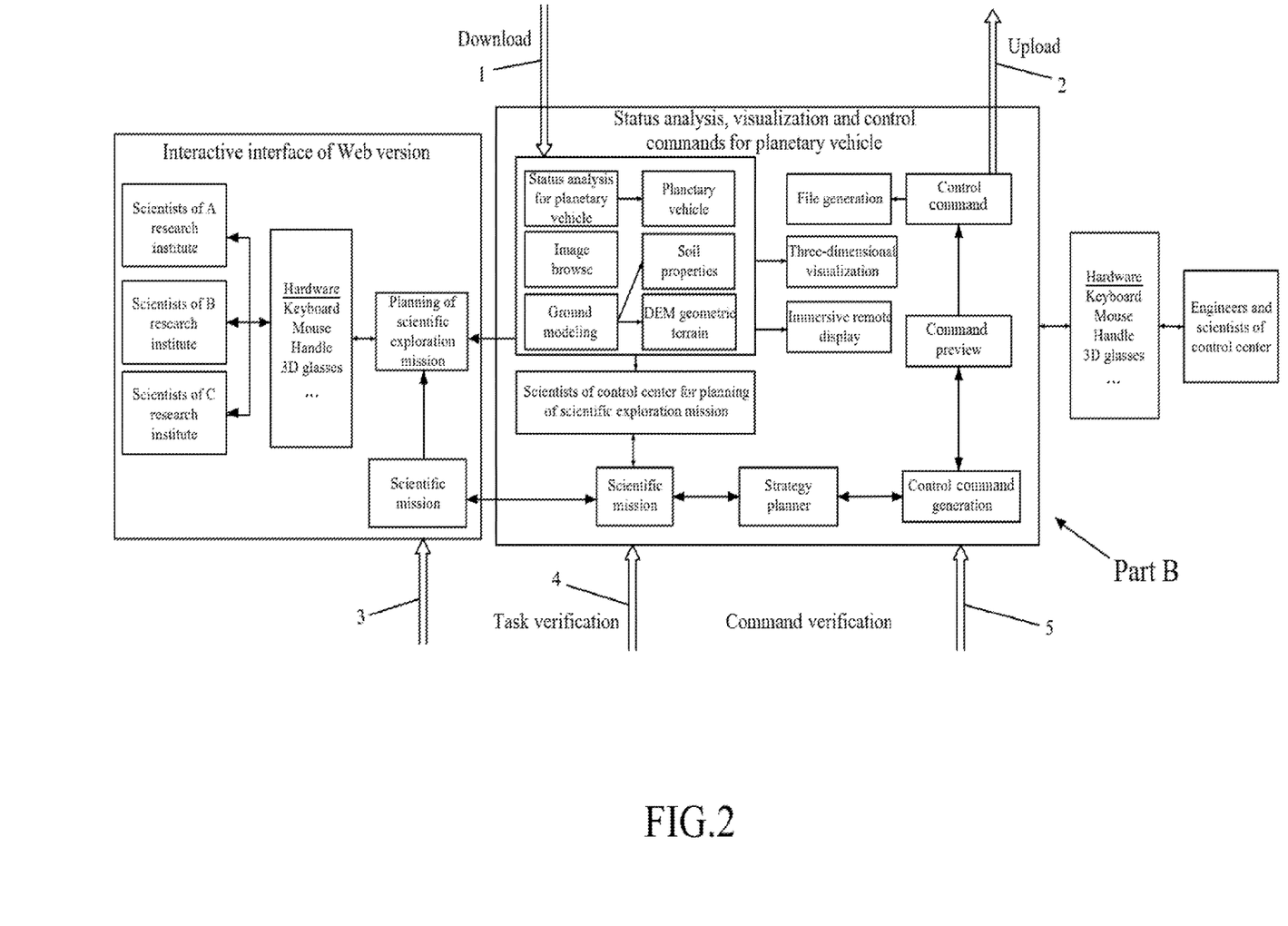
FIG. 2 is a schematic flowchart of part B of a three-layer intelligence system architecture for an exploration robot according to an embodiment of the present invention.
Figure 3:
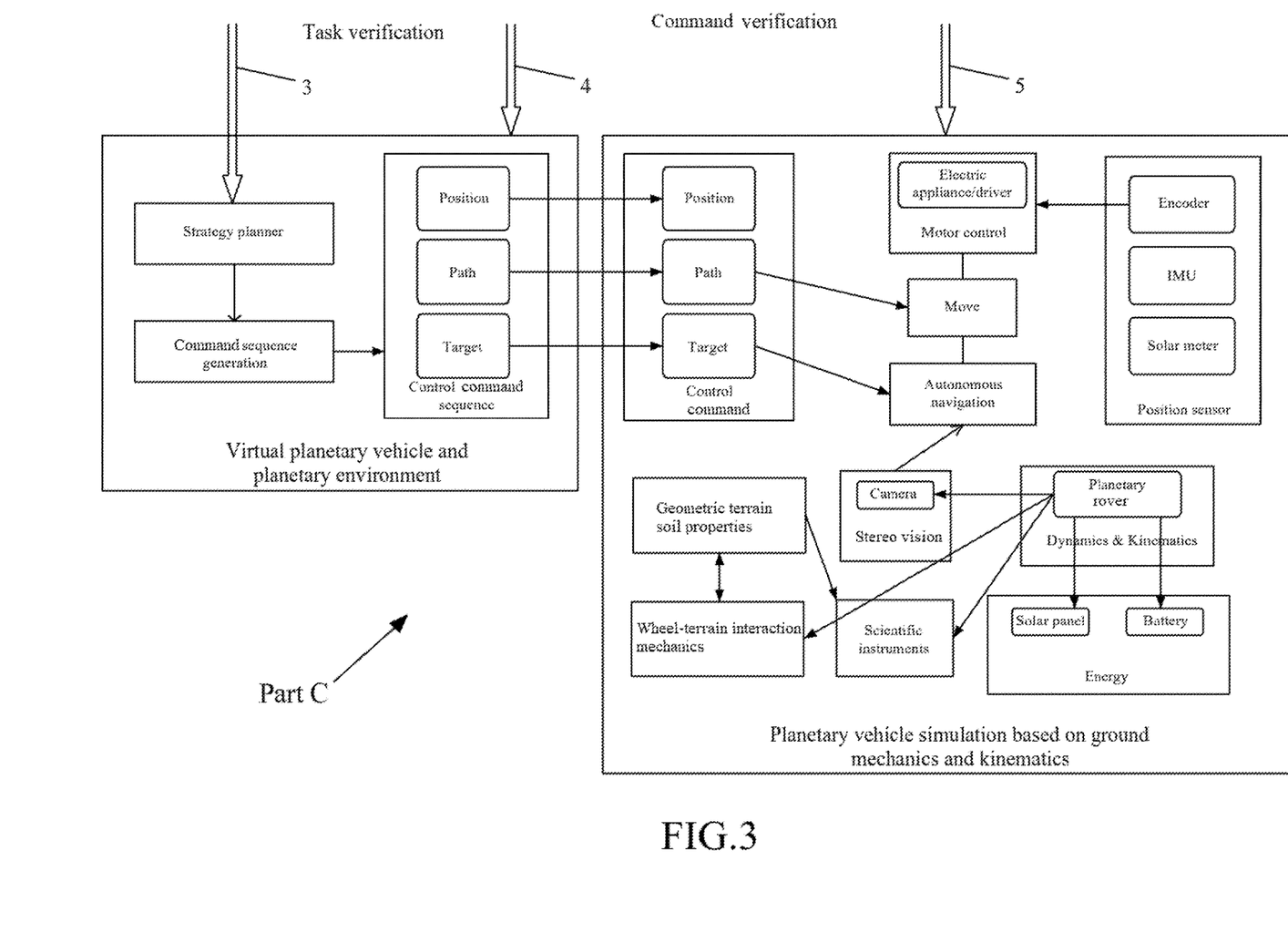
FIG. 3 is a schematic flowchart of part C of a three-layer intelligence system architecture for an exploration robot according to an embodiment of the present invention.
Figure 4:
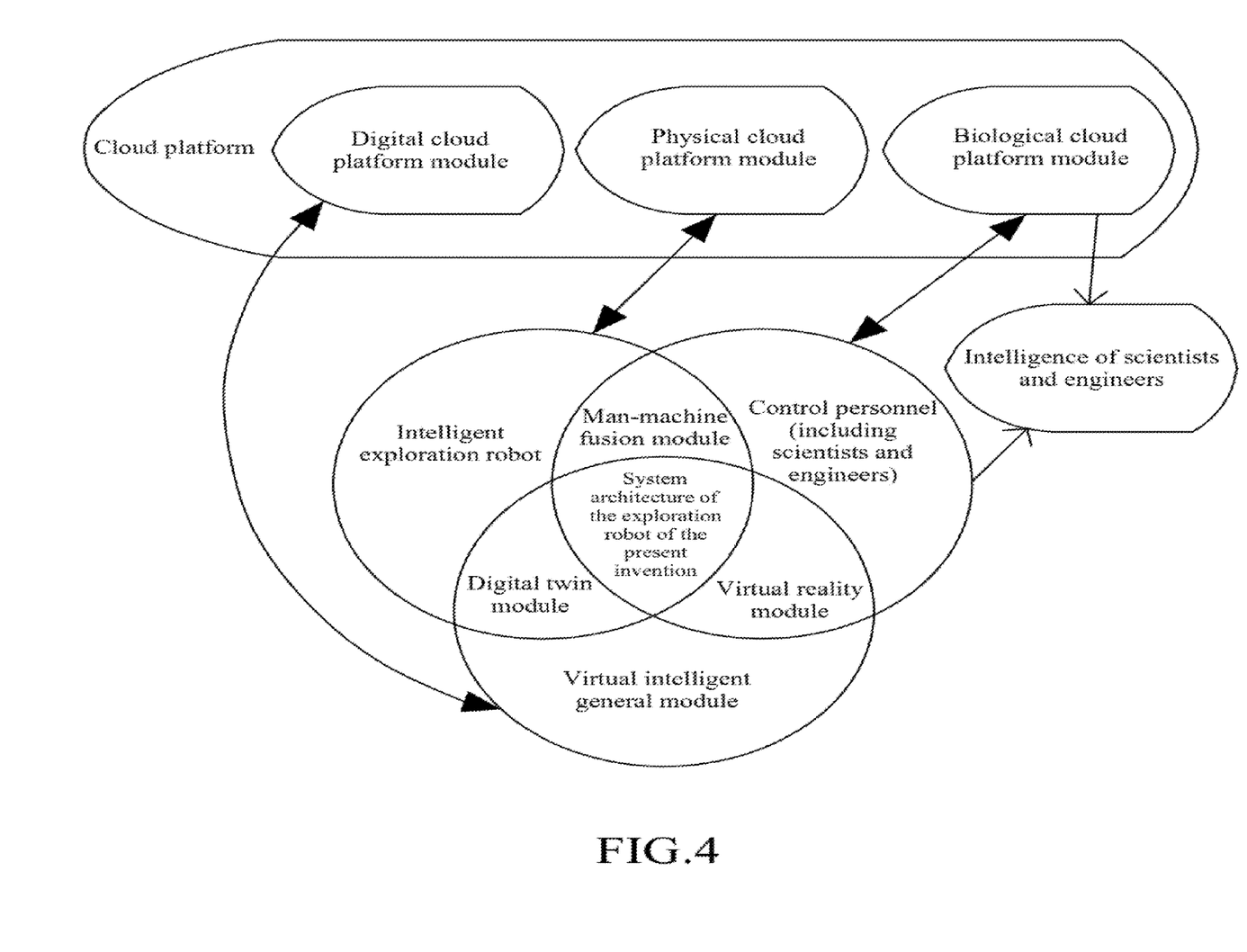
FIG. 4 is a diagram showing a mapping between an exploration robot and a cloud platform according to an embodiment of the present invention.

In addition, in FIG. 1, s is the wheel slip rate of the intelligent exploration robot; z is the wheel sinkage amount of the intelligent exploration robot; f is the force information of the wheels of the intelligent exploration robot (the force in x-y-z direction and the moments, a total of six quantities, called: six-dimensional force information); w is the wheel speed. From the wheel sinkage amount z, the slip rate s and the six-dimensional force f, the soil properties may be calculated by the relevant terramechanics formulas.

The planetary exploration robot performs the next step according to the command (reaches the position of the target, i.e., performing navigation). The navigation phase may be divided into processes of analysis of landform accessibility, path planning and path tracking. The planetary exploration robot uses the previously established map, combined with the kinematics and dynamics information of its own structure, to determine which places on the map are safe for the planetary exploration robot to pass (too large ground slope, too many ground obstacles, too soft ground soil etc. are all situations where the robot may not pass through), to use the determination results to plan how to reach the specified target point (here, there will be different path results according to different planning standards, wherein the shortest path and the smallest energy are all a kind of standard for planning the path), and to perform path tracking after the planning of the path. Then, the planetary exploration robot reaches the target location according to the planned path for sampling or uses scientific instruments to analyze related scientific targets. During the navigation phase, some very complex ground conditions may be encountered, then the planetary exploration robot itself may not plan the path to the designated target location and requires the assistance of the ground staff; the ground staff performs the above processes of the analysis on accessibility, the path planning and the path tracking in the virtual exploration environment, and may repeatedly test and verify commands, so as to upload a feasible command to the control system of the real exploration robot after obtaining the feasible command, and instruct the robot to move according to the command and reach the designated target point. In summary, with the three-body intelligent robot of the embodiment, the scientists and engineers in the planetary exploration mission become intelligent by combining with the biological cloud platform module, i.e., becoming intelligence of the control personnel, and the tasks of the intelligent exploration robot and the virtual intelligent general module are clearly defined, thus forming a three-layer intelligence system architecture; subsequently, the intelligent exploration robot, the virtual intelligent general module and the intelligence of the control personnel cross each other to form the digital twin module, the virtual reality module and the man-machine fusion module, and make them cooperate closely and integrate with each other to complete the planetary exploration mission reliably, efficiently and intelligently, which is a typical application scenario for the three-layer intelligence system architecture.

Although the present invention is disclosed as above, the protection scope of the present invention is not limited to this. Those skilled in the art can make various changes and modifications without departing from the spirit and scope of the present invention, and these changes and modifications will fall within the protection scope of the present invention.

What is claimed is:

1. A three-layer intelligence system architecture for an exploration robot, comprising:
   a digital twin module, configured to create a virtual exploration environment and a virtual robot according to environment data of an explored environment acquired in real time by the exploration robot and robot data of the exploration robot;
   a virtual reality module, configured to generate a process and a result of the virtual robot executing the control commands in the virtual exploration environment according to the virtual exploration environment, the virtual robot, and control commands of a control personnel for the exploration robot; and
   a man-machine fusion module, configured to transmit the control commands and showing the control personnel the process and the result of the virtual robot executing the control commands in the virtual exploration environment, and causing the exploration robot to execute the control commands after acquiring a feedback indicating that the control personnel confirms the control commands;
   wherein the exploration robot is an intelligent exploration robot;
   wherein the three-layer intelligence system architecture for the exploration robot and a cloud platform are mapped to each other;
   wherein the three-layer intelligence system architecture for the exploration robot further comprises a virtual intelligent general module, the virtual intelligent general module comprising the digital twin module and the virtual reality module;
   the cloud platform has a plurality of cloud platforms, the plurality of cloud platforms comprising:
      a digital cloud platform module, mapped to the virtual intelligent general module; and/or
      a physical cloud platform module, mapped to the exploration robot; and/or
      a biological cloud platform module, mapped to the control personnel through the man-machine fusion module;
   wherein the digital twin module causes the explored environment and the virtual detection environment to map to each other, and/or the digital twin module causes the exploration robot and the virtual robot to map to each other;
   wherein the explored environment is synchronized with the virtual exploration environment in real time, and the exploration robot is synchronized with the virtual robot in real time.

2. The three-layer intelligence system architecture for an exploration robot according to claim 1, wherein the control commands comprise determining a scientific exploration target of the exploration robot or determining a traveling path of the exploration robot.

3. The three-layer intelligence system architecture for an exploration robot according to claim 1, wherein the digital twin module is configured to create the virtual exploration environment according to environment data of the explored environment acquired in real time by the exploration robot and set data.

4. The three-layer intelligence system architecture for an exploration robot according to claim 1, wherein the man-machine fusion module comprises VR glasses and/or somatosensory seats to show the control personnel the process of the virtual robot executing the control commands in the virtual exploration environment.

5. An exploration robot, comprising a three-layer intelligence system architecture, the three-layer intelligence system architecture comprising:
   a digital twin module, configured to create a virtual exploration environment and a virtual robot according to environment data of an explored environment acquired in real time by the exploration robot and robot data of the exploration robot;
   a virtual reality module, configured to generate a process and a result of the virtual robot executing the control commands in the virtual exploration environment according to the virtual exploration environment, the virtual robot, and control commands of a control personnel for the exploration robot; and
   a man-machine fusion module, configured to transmit the control commands and showing the control personnel the process and the result of the virtual robot executing the control commands in the virtual exploration environment, and causing the exploration robot to execute the control commands after acquiring a feedback indicating that the control personnel confirms the control commands;
   wherein the exploration robot is an intelligent exploration robot;
   wherein the three-layer intelligence system architecture for the exploration robot and a cloud platform are mapped to each other;
   wherein the three-layer intelligence system architecture for the exploration robot further comprises a virtual intelligent general module, the virtual intelligent general module comprising the digital twin module and the virtual reality module;
   the cloud platform has a plurality of cloud platforms, the plurality of cloud platforms comprising:
      a digital cloud platform module, mapped to the virtual intelligent general module; and/or
      a physical cloud platform module, mapped to the exploration robot; and/or
      a biological cloud platform module, mapped to the control personnel through the man-machine fusion module;
   wherein the digital twin module causes the explored environment and the virtual detection environment to map to each other, and/or the digital twin module causes the exploration robot and the virtual robot to map to each other;
   wherein the explored environment is synchronized with the virtual exploration environment in real time, and the exploration robot is synchronized with the virtual robot in real time.

6. The exploration robot according to claim 5, wherein the exploration robot is a planetary intelligent exploration robot or a deep-sea intelligent exploration robot.

* * * * *